United States Patent
Mahmood

(10) Patent No.: US 10,018,110 B2
(45) Date of Patent: Jul. 10, 2018

(54) DOUBLE BAR SINGLE WHEEL ROTARY COMBUSTION ENGINE AND THE COMPONENTS THEREOF

(71) Applicant: Fahim Mahmood, Sylhet (BD)

(72) Inventor: Fahim Mahmood, Sylhet (BD)

(73) Assignee: Fahim Mahmood, Sylhet (BD)

( * ) Notice: Subject to any disclaimer, the term of this patent is extended or adjusted under 35 U.S.C. 154(b) by 240 days.

(21) Appl. No.: 15/083,189

(22) Filed: Mar. 28, 2016

(65) Prior Publication Data

US 2016/0290221 A1    Oct. 6, 2016

Related U.S. Application Data

(63) Continuation-in-part of application No. 13/438,848, filed on Apr. 4, 2012, now Pat. No. 9,528,433.

(51) Int. Cl.
| | |
|---|---|
| *F02B 53/00* | (2006.01) |
| *F01C 21/08* | (2006.01) |
| *F01L 1/46* | (2006.01) |
| *F01C 1/352* | (2006.01) |
| *F01L 1/047* | (2006.01) |

(52) U.S. Cl.
CPC .............. *F02B 53/00* (2013.01); *F01C 1/352* (2013.01); *F01C 21/08* (2013.01); *F01C 21/0809* (2013.01); *F01L 1/047* (2013.01); *F01L 1/462* (2013.01); *Y02T 10/17* (2013.01)

(58) Field of Classification Search
CPC ...... F01C 1/352; F01C 21/0809; F01C 1/084; F01C 1/086; F01C 1/22; F01C 1/24; F01C 17/02; F01C 17/00; F01C 17/04; F01C 1/07; F01C 1/077; F01C 1/344; F01C 1/3446; F01C 1/04; F01C 1/08; F02B 53/00; F02B 53/02; F02B 2053/005; F02B 2075/027; Y02T 10/17
See application file for complete search history.

(56) References Cited

U.S. PATENT DOCUMENTS

| | | | | |
|---|---|---|---|---|
| 1,427,053 | A * | 8/1922 | Bidwell ................... | F02B 53/00 123/231 |
| 3,964,442 | A * | 6/1976 | Hunter ...................... | F01C 1/32 123/242 |
| 7,415,962 | B2 * | 8/2008 | Reisser ................... | F02B 53/02 123/241 |
| 9,528,433 | B2 * | 12/2016 | Mahmood ............... | F02B 53/00 |
| 2013/0263817 | A1 * | 10/2013 | Mahmood ............... | F02B 53/00 123/200 |

* cited by examiner

Primary Examiner — Mary A Davis

(57) ABSTRACT

The inventive rotary engine comprises a cylindrical chamber inside a casing wherein there is a concentric rotatable power shaft and a rotatable asymmetric main wheel mounted eccentrically enough as such to avoid contact with the wall of cylindrical chamber. Additionally two bars traversing the main wheel radially further having a wiping contact with the cylindrical chamber wherein one bar is fixed with power shaft and other bar is hinged with said power shaft. A combustion process is in action within a demarcated combustion chamber whereby the combustion chamber rotatably travels from a bottom dead volume to a top dead volume and hence a power, generated during this path of rotational travel, is subsequently available for delivery at the concentric power shaft.

16 Claims, 12 Drawing Sheets

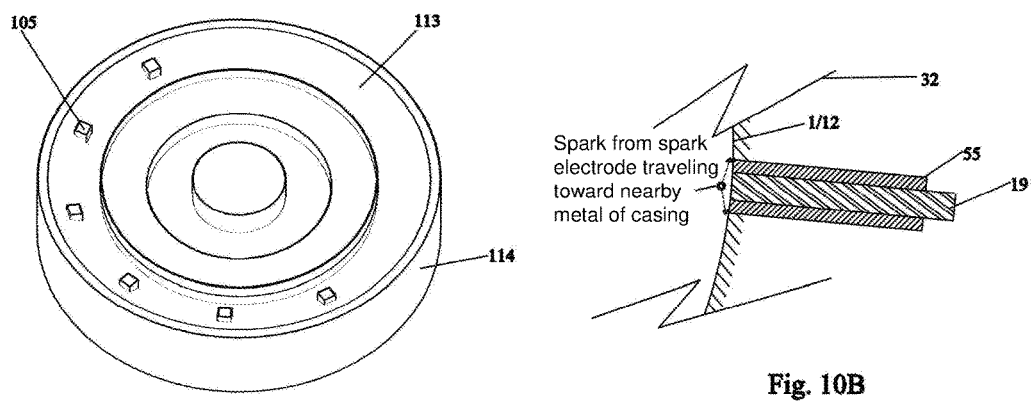
Fig. 10A
Fig. 10B
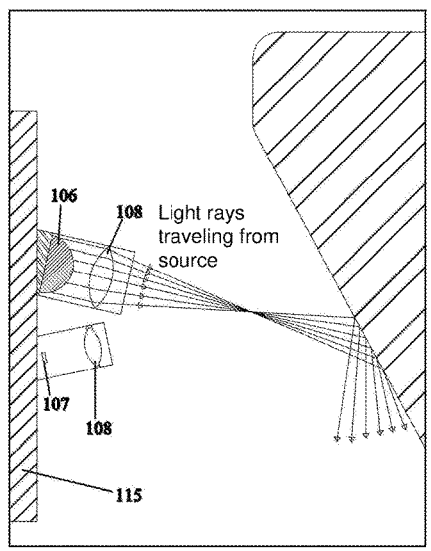
Fig. 10C
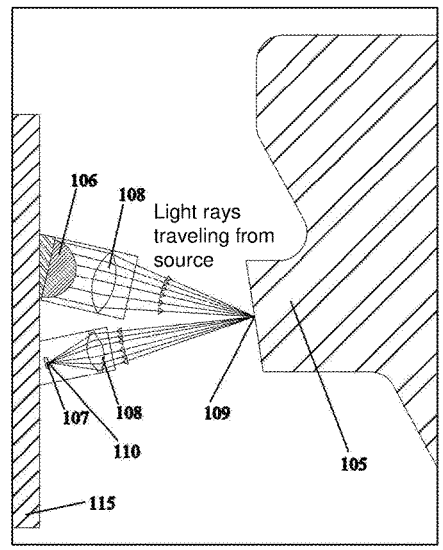
Fig. 10D

DOUBLE BAR SINGLE WHEEL ROTARY COMBUSTION ENGINE AND THE COMPONENTS THEREOF

CROSS-REFERENCE TO RELATED APPLICATIONS

This application is the continuation in part of parent U.S. application Ser. No. 13/438,848, filed on Apr. 4, 2012. The publication no. is US 20130263817 A1. Consequently all patent citations of parent application of Ser. No. 13/438,848 should be applicable to the current application.

STATEMENT REGARDING FEDERALLY SPONSORED RESEARCH OR DEVELOPMENT (Not Applicable)

REFERENCE TO SEQUENCE LISTING, A TABLE, OR A COMPUTER PROGRAM LISTING COMPACT DISC APPENDIX (Not Applicable)

BACKGROUND OF THE INVENTION

This invention is basically best suited for automobiles and power generation followed by the preceding US parent application of "Double bar single wheel rotary combustion engine". Now-a-days reciprocating engine is widely used in automobile and power generation sector for its low wear rate and comparative high torque. But the downside exists as a good portion of fuel is lost to generate this torque. The most efficient reciprocating engine exhibits its fuel conversion efficiency not more than 35%. But on a varying speed during transportation, this fuel efficiency becomes even much lower. However a hybrid electric power system is introduced in automobile sector which eliminates most of its loss in efficiency under varying condition on road which elevates the overall engine efficiency closer to 35%. Though reciprocating engine in no doubt that producing a helpful power for daily use but not enough handsome power to produce in terms of gradually diminishing fossil fuel used. As the lost fuel energy cannot be resurrected therefore better efficient engine is needed to save the remaining fossil fuel reservoir on earth inasmuch as possible.

Reciprocating engine basically loses heat energy through the intermediate linkage between the piston and the crankshaft and this unused heat energy is responsible for global warming. Being aware of this situation the inventor motivated himself to propose this rotary engine. This rotary engine comprises less complexity and minimal components between the after burnt gas exposure to the power delivery shaft therefore demonstrating an acceptable efficiency in terms of the theory of torque.

This rotary engine can be operable with any gasoline or hydrogen fuel. To generate hydrogen fuel it should be wise not to use the electricity generated on the land. Rather an alternative system can be adopted for using solar panel on the sea side to do the job of hydrolysis. The hydrogen fuel can also be used in the reciprocating engine but due to low efficiency the global warming cannot be resisted. Considering the facts above the proposed rotary engine thus being modified enough and subsequently equipped with a simplified converting linkage along with a gradually increased combustion surface on the moving parts in order to achieve a higher efficiency over the existing rotary and reciprocating engine.

BRIEF SUMMARY OF THE INVENTION

The proposed rotary engine comprises a cylindrical cavity inside a casing or a housing wherein there is a rotatable power shaft mounted coaxially to the cylindrical cavity and a rotatable main wheel mounted eccentrically enough as such to avoid contact with the wall of that cylindrical chamber/cavity and at least two bars traversing the main wheel radially further having a wiping contact with the cylindrical chamber wherein one bar (prime mover) is fixed with power shaft and other bar (follower) is hinged with said power shaft. A combustion process is engaged in a demarcated combustion chamber whereby the combustion chamber rotatably travels from a bottom dead volume to a top dead volume and a power, generated during this path of rotational travel, is subsequently available for delivery at that concentric power shaft.

Additionally at least four outward opening valves control the inlet and exhaust of gases whenever the valve operation is dependent upon the concentric power shaft. As the bottom dead volume and the top dead volume are allocated in totally two different and opposite positions within the cylindrical cavity that's why at least two valves for inlet and at least two valves for outlet have been introduced to smoothly connect the transition phase between the bottom dead volume and the top dead volume wherein the timing of the second valve is lagging with that of the first valve by an angle in cam alignment in each valve assembly. The valve should be outward opening type as such to avoid any major collision between the rotating bars and the valve end. The outward opening valve moves away from the cylindrical cavity to open a valve port and therefore for this kind of function, this valve type is named as outward opening valve.

The main wheel structure enrolls a significant theme in this invention as its asymmetric structure is responsible for a vibration reduction in this engine. Furthermore the torque enhancer pocket arranged on a combustion surface of the main wheel that donates the power to engine in dual mode. The first mode of power generation is done by the bars through a pressure exposure on the difference of exposed surface of the bars and the second mode of power generation is done by the main wheel with the help of the torque enhancer pocket(s) alone. Microcontroller controlled precise spark timing in accordance with the timing mark on the flywheel is introduced to confirm the precise timing of combustion within the demarcated combustion chamber. In addition the spark plug is modified over the conventional one as to be a surface oriented in order to reduce lubricant burning in the combustion chamber and subsequently as to have a clean spark surface in each rotation of the power shaft.

BRIEF DESCRIPTION OF THE SEVERAL VIEWS OF THE DRAWING

Detailed description of drawing figures are described below.

Figure 1:
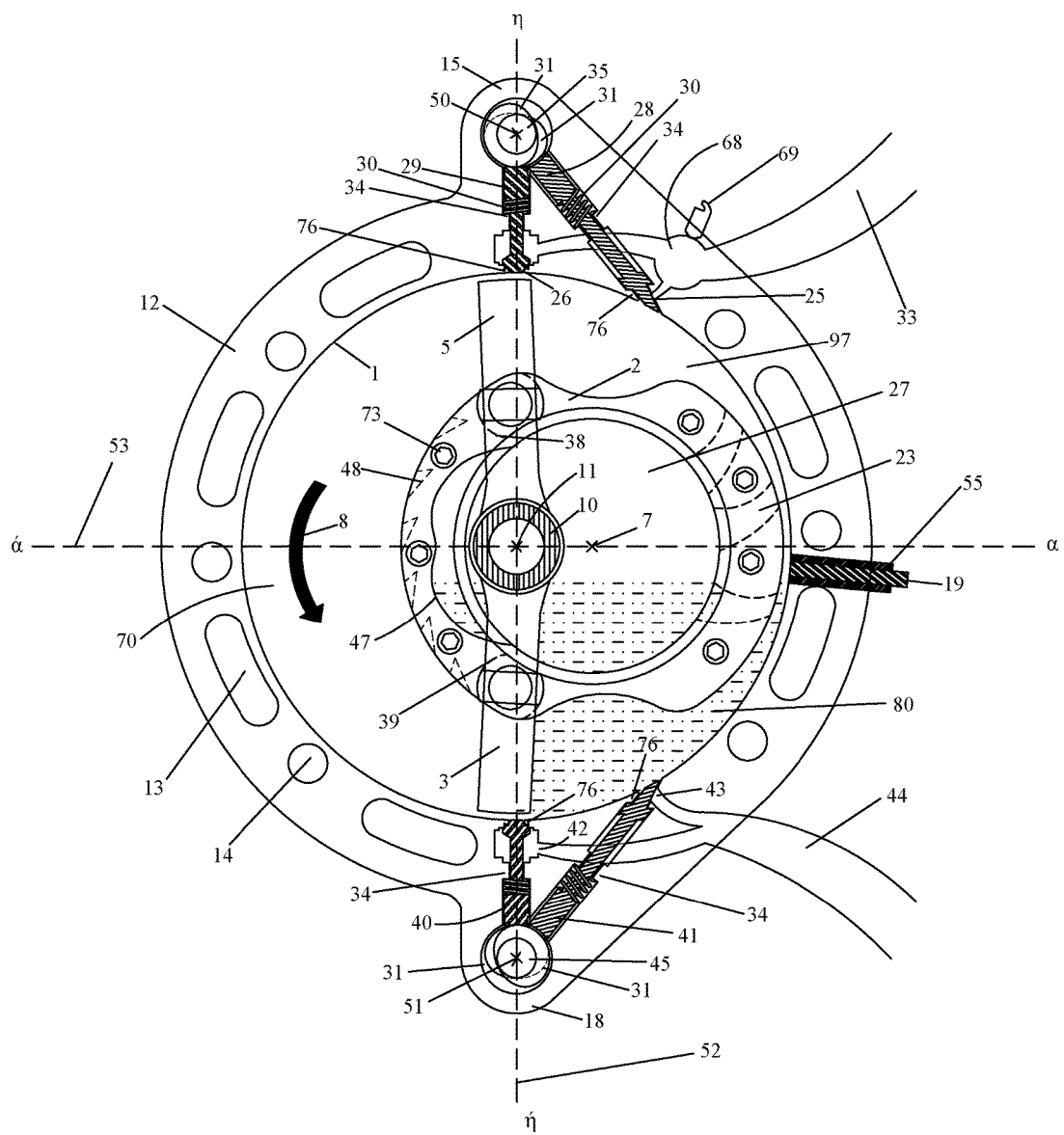

FIG. 1 shows the schematic of an engine cell or an engine module consisting of inner circular chamber (1), main wheel (2), power shaft or output shaft (10), two guider wheels (16),(20) and two rotatable bars (3),(5).

Figure 2:
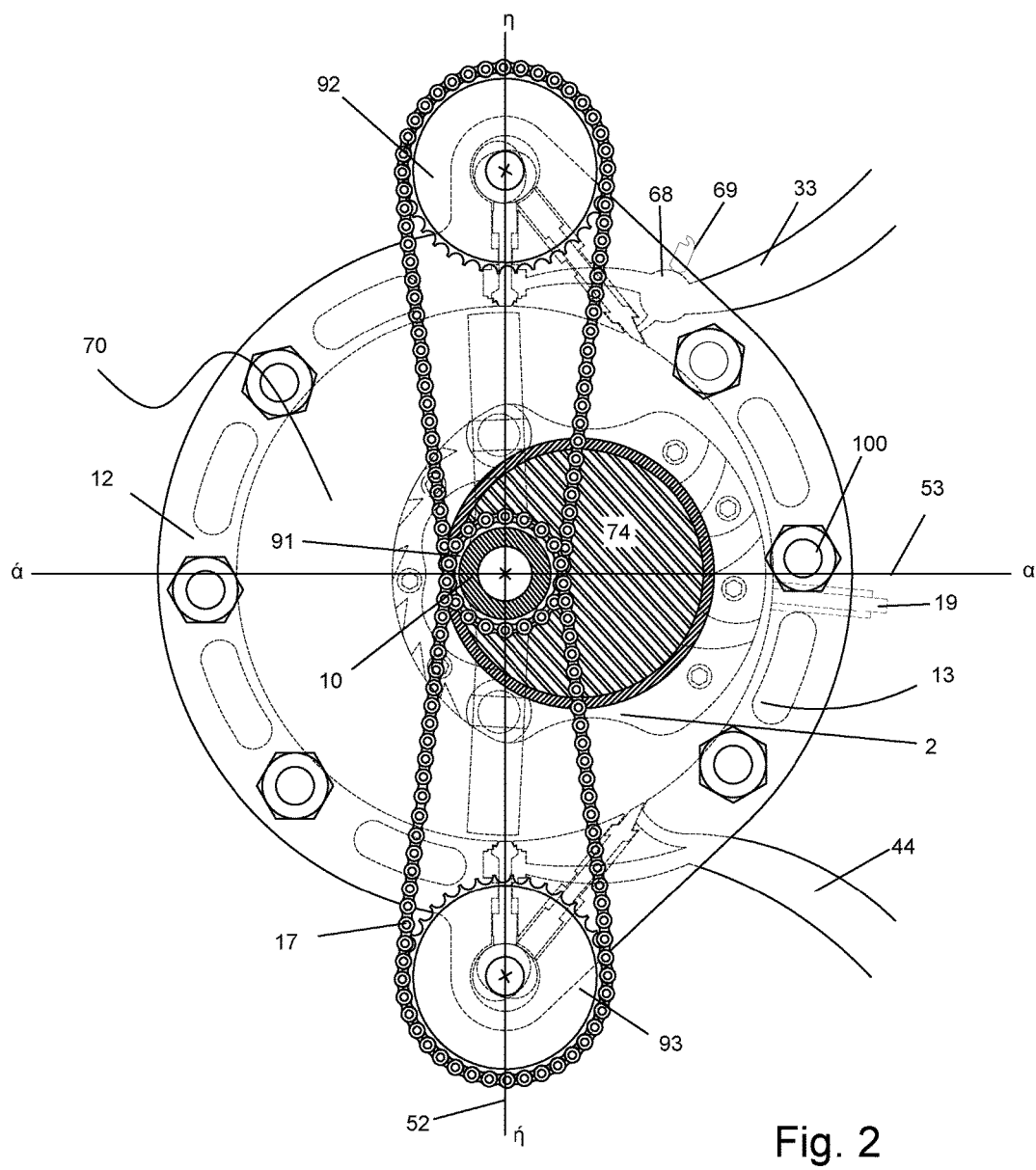

FIG. 2 represents the driving assembly of camshaft by the power shaft by timing chains.

Figure 3:
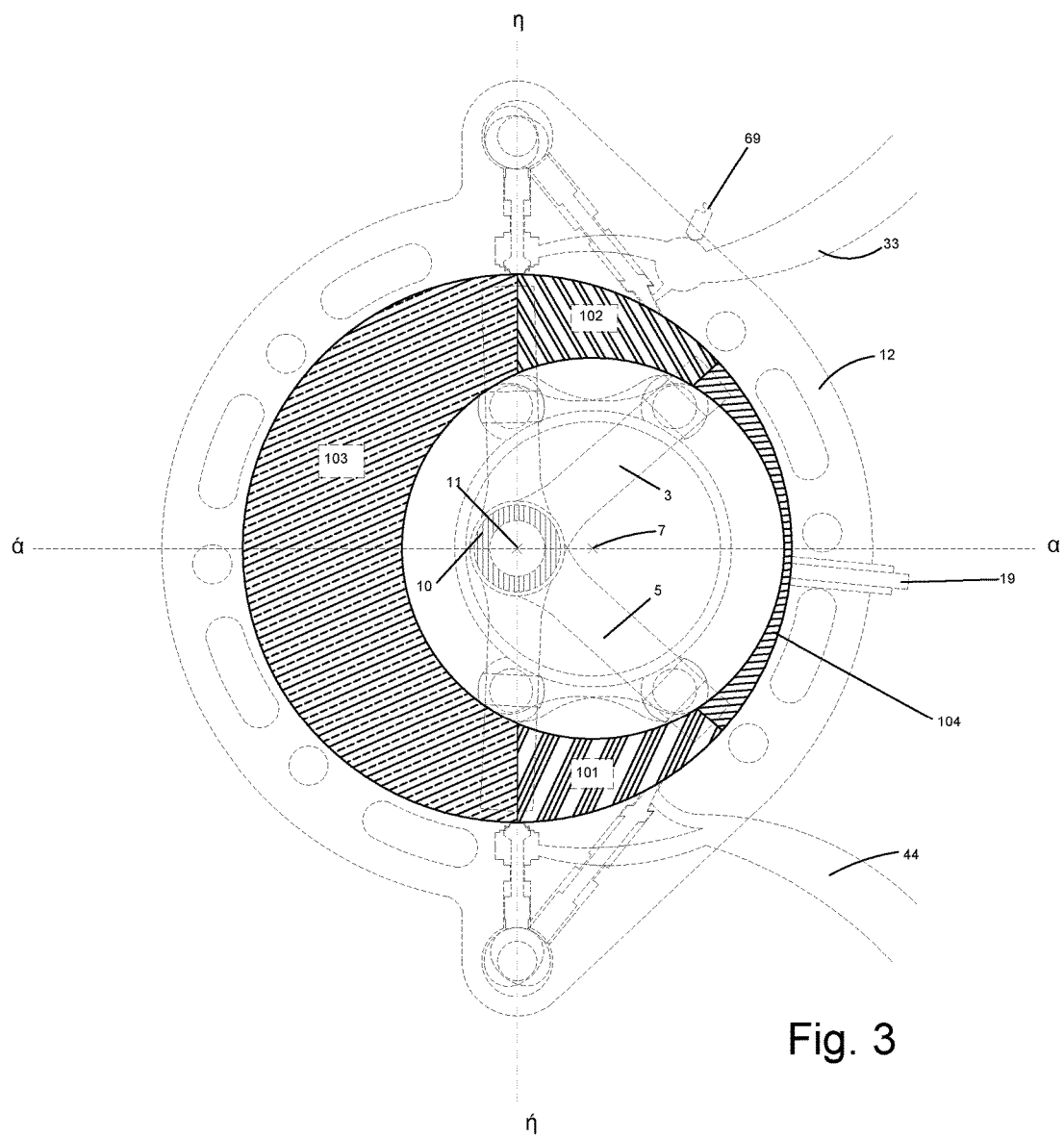

FIG. 3 represents notation of the bottom dead volume (104), top dead volume (103) and the two transition phases (101,102) and the valve arrangements to smoothly cope with the transition phases.

Figure 4A:
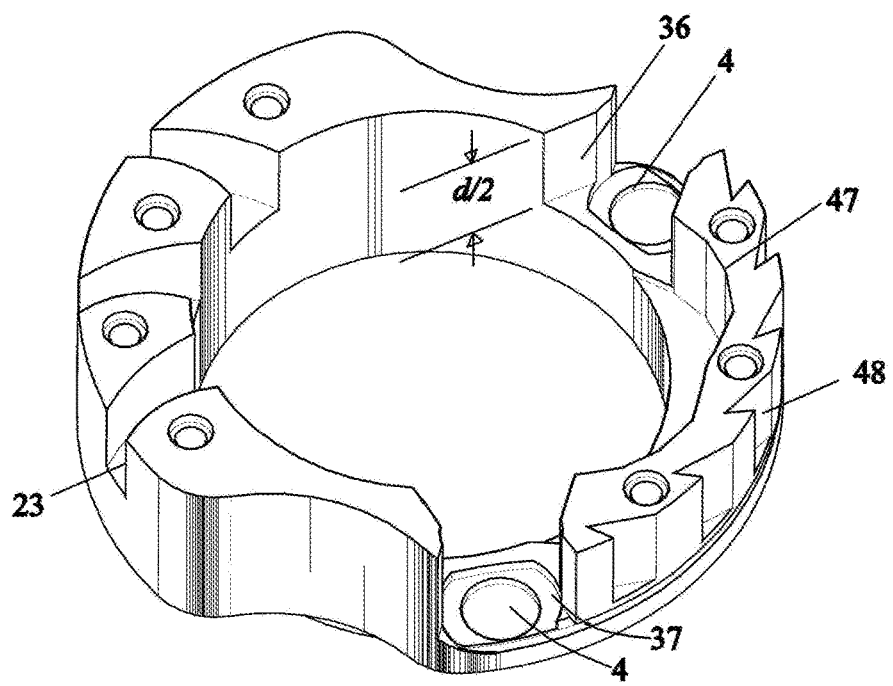
Figure 4B:
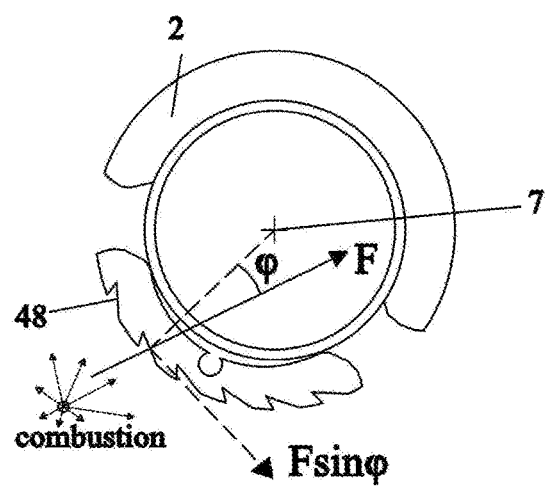

FIG. 4A represents 3D view of a half of main wheel while FIG. 4B illustrating torque enhancer pockets terminology.

Figure 5A:
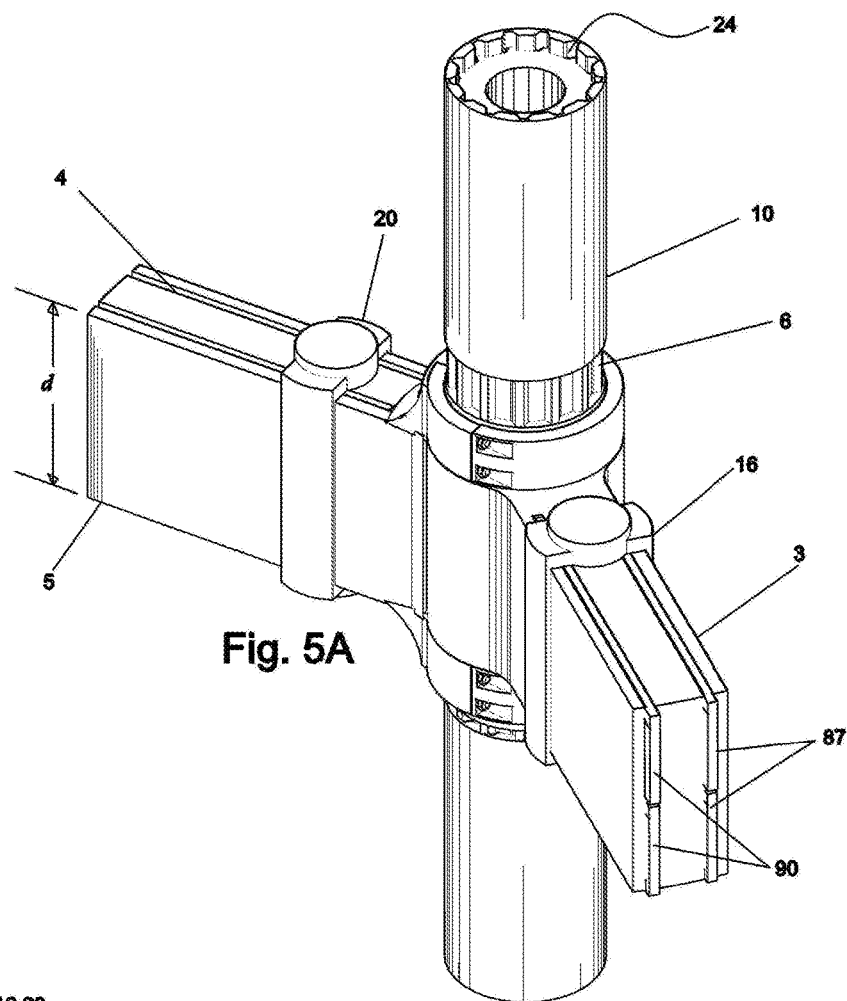
Figure 5B:
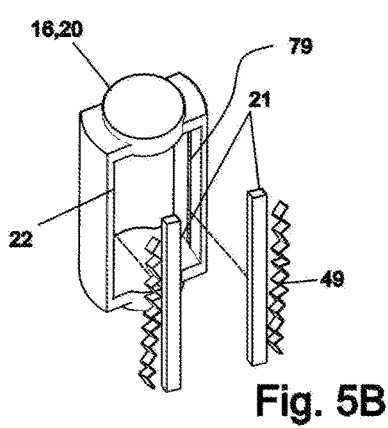
Figure 5C:
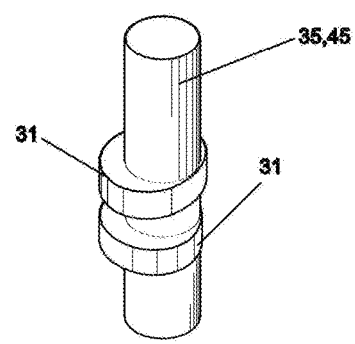

FIG. 5A represent 3D view of bars assembly, FIG. 5B illustrating sealing arrangement in guider wheel (16, 20) and FIG. 5C representing the securing of both the cams in a camshaft.

Figure 6:
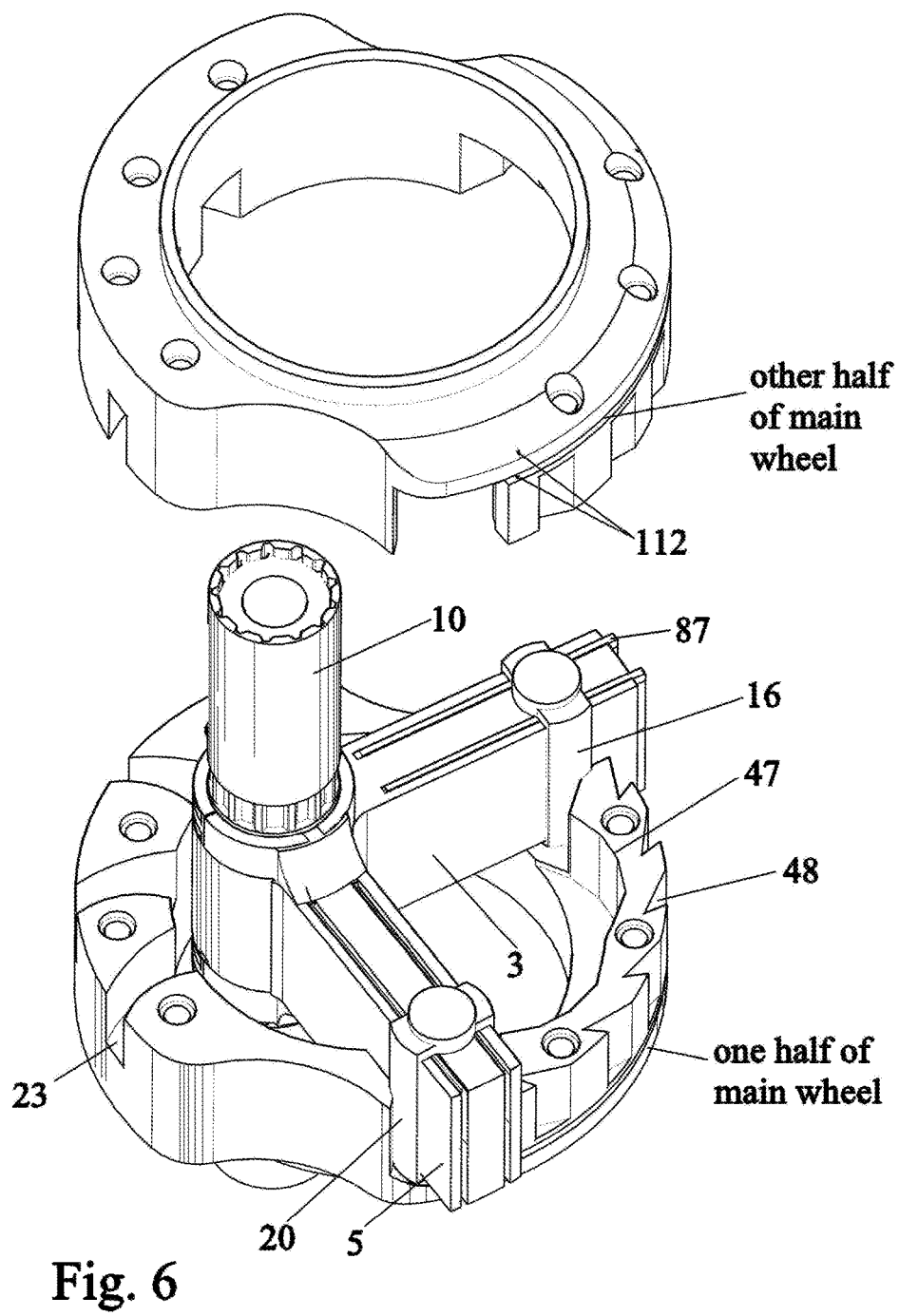

FIG. 6 represents an exploded 3D view of main wheel and bars assembly.

Figure 7A:
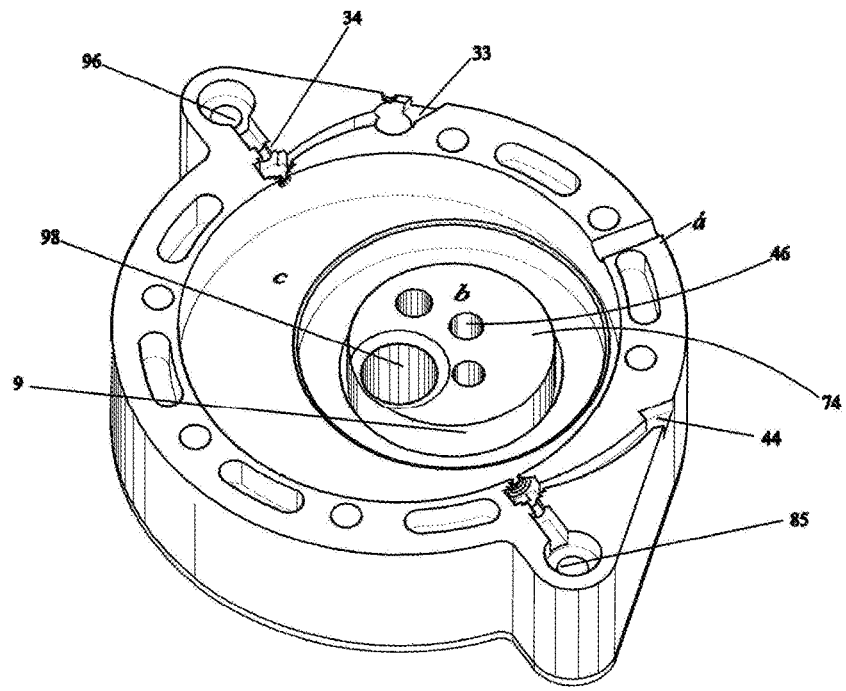
Figure 7B:
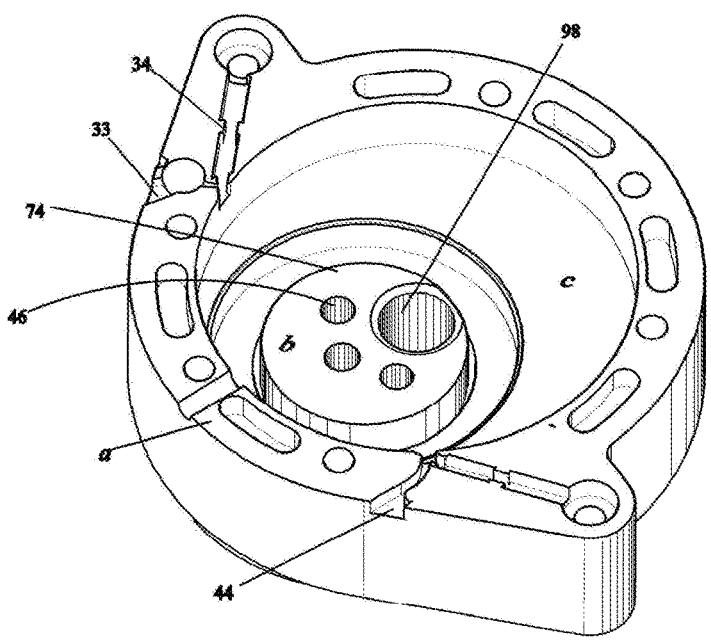

FIG. 7A, FIG. 7B presenting both the casing halves respectively when a casing is divided into two halves.

Figure 8A:
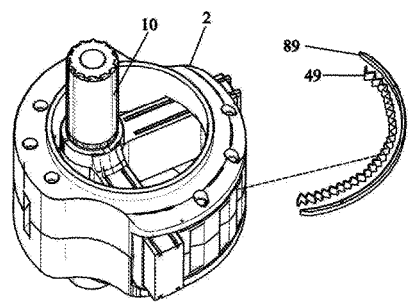
Figure 8B:
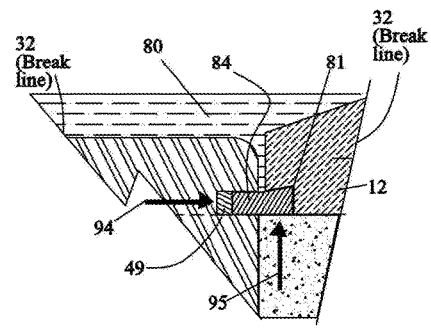
Figure 8C:
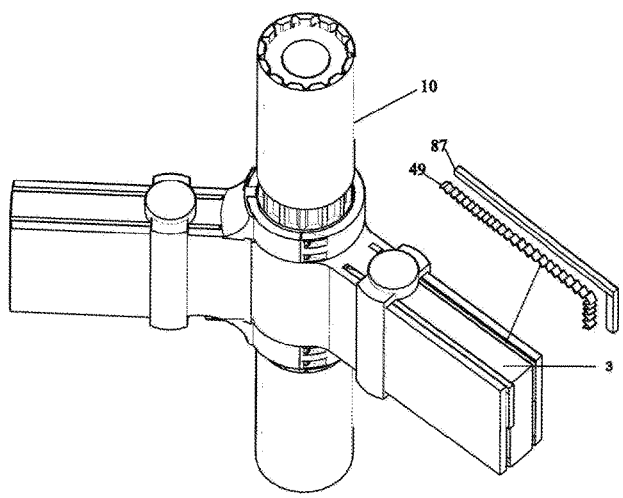
Figure 8D:
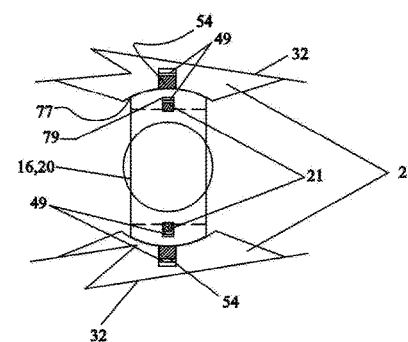

FIG. 8A represents a face seal attachment in the main wheel wherein a tiny metal rod is coupled within hole (112) to facilitate a radial loose fit coupling of face seal with the main wheel. FIG. 8B represents the cross section/side view of face seal (89) which is pushed against the groove (81) at casing (12) by a pleated formed spring force (94) and by a gas pressure (95). FIG. 8C is presenting a bar/wiper seal arrangement on free ends of bars (3, 5) and FIG. 8D is presenting internal (21) and external sealing (54) of guider wheel.

Figure 9:
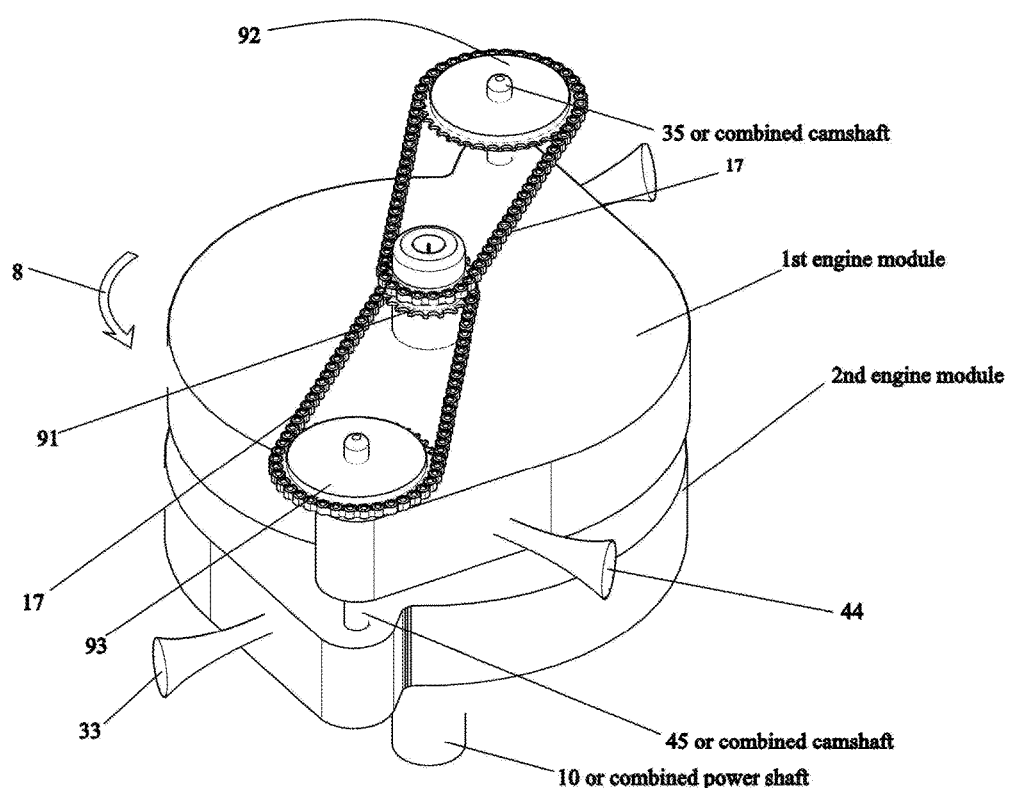

FIG. 9 represents the combination of a plurality of engine module in parallel.

FIG. 10A represents the flywheel to be secured with power shaft, FIG. 10B representing sparking by a surface oriented spark plug on the internal wall of casing (12) and FIG. 10C, FIG. 10D represents the terminology of an optically controlled mechanism in presence of reflector (105).

Figure 11A:
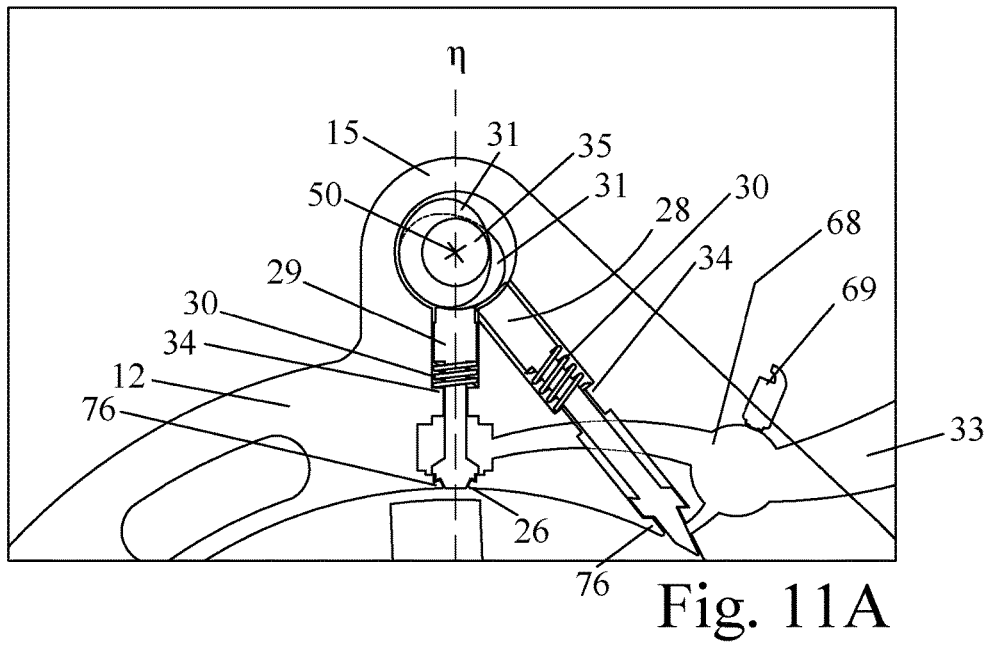
Figure 11B:
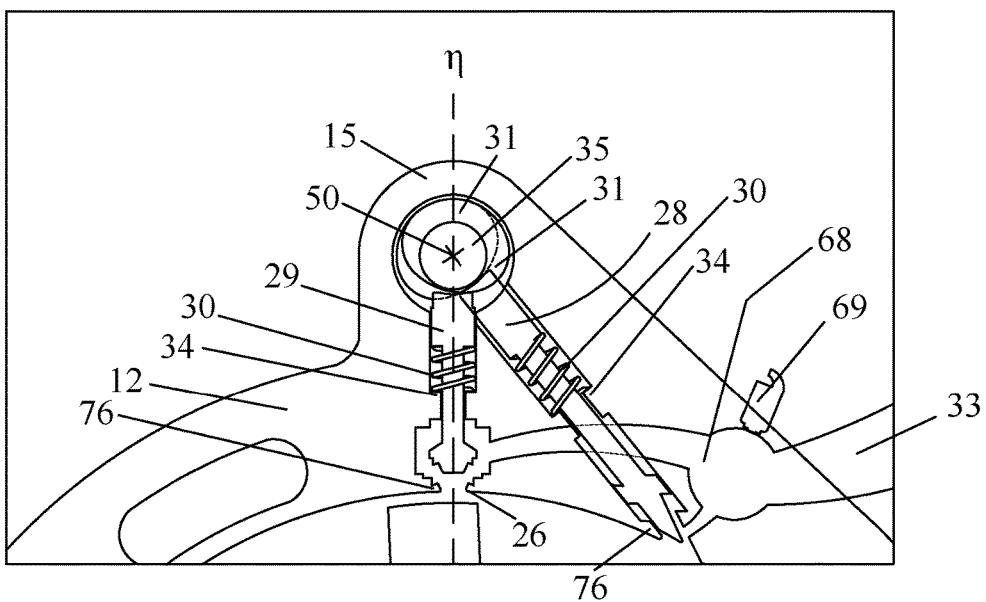

FIG. 11A, FIG. 11B represents outward opening valve assembly.

Figure 12:
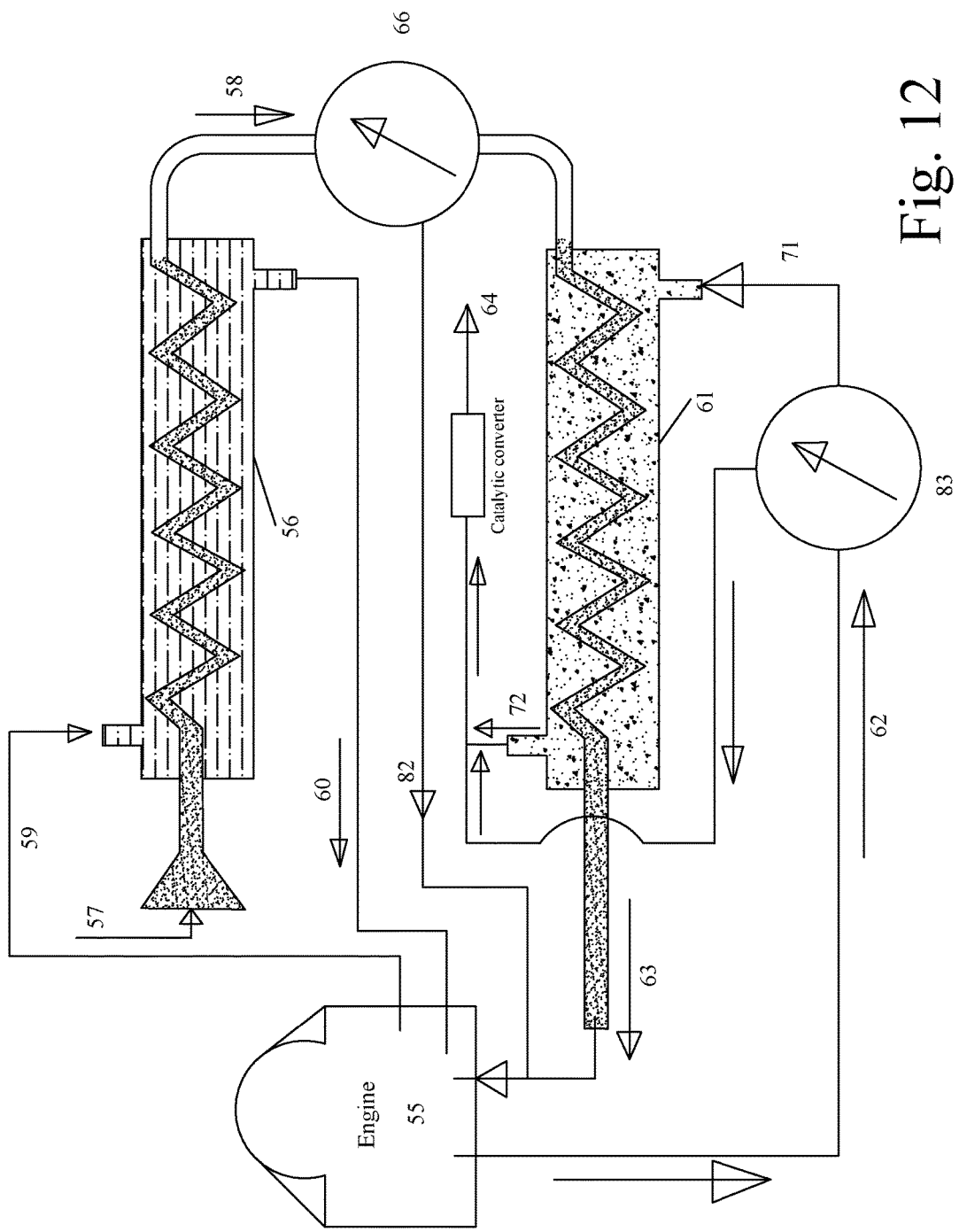

FIG. 12 is representing flow diagram of double stage heat exchanger.

DETAILED DESCRIPTION OF THE INVENTION

In a fundamental point of view, a main wheel symbolically represented by (2) rotating around a second rotary axis within an inner circular chamber and this inner circular chamber is represented by (1) further can be defined as a perfect cylindrical cavity/chamber within an engine casing (12). The perfect cylindrical cavity is defined as a right circular shaped box or cylinder within casing (12). Subsequently the circular shaped cavity/cylinder is bounded by two solid parallel planes. A power shaft (10) rotating around a first rotary axis (11) that mounted coaxially to and within inner circular chamber (1) wherein the first rotary axis is perpendicular with anyone of aforesaid planes. The main wheel (2) is rotating around the second rotary axis (7) or its own axis within the inner circular chamber (1) but avoiding a contact with the circular wall of the inner circular chamber in such a way that the second rotary axis (7) is shifted from the first rotary axis while the first rotary axis (11) and the second rotary axis (7) are parallel to each other when aligned in a second plane (53) or αα plane illustrated in FIG. 1. At least two bars (3,5) or vanes also rotating around a first rotary axis and extending along the circular wall of the inner circular chamber (1) by traversing the main wheel radially as such to have a wiping contact with the wall of the inner circular chamber. This wiping contact is basically a number of bar seal (87, 90) to fill a gap between bars (3, 5) and the inner circular chamber. The bars thus being required for a coupling with the power shaft (10) to rotate around the first rotary axis (11) wherein the coupling denoting to secure the prime mover (3) (one of the bars male thread (6) coupled in female thread (24)) with power shaft and to hinge the follower (5) (other one of the bars) with said power shaft illustrated in FIG. 5A. The bars are coupled within the main wheel (2) by the specially designed guider wheel (16, 20) which is optimised for allowing a sliding motion and a hinging motion in a common plane only. The guider wheel (16, 20) is further designed as such to have a compact structure with a rectangular through hole (22) within and subsequently providing a continuous sealing between the bars (3, 5) and the main wheel (2) in any angular position of the bars. As the guider wheel (16, 20) involving the reciprocating motion within the main wheel along the guided circular trench (38,39) illustrated in FIG. 1, therefore the coupling between the main wheel and guider wheel operates as a journal coupling with a gap (77) wherein the lubricating oil (80) lubricates the journal surface illustrated in FIG. 8D. A plurality of torque enhancer pocket (48) organized on the circular combustion surface of the main wheel (2) as such to provide a tangential thrust over the main wheel when a gaseous pressure is exposed on it as like FIG. 4B. Each torque enhancer pocket (48) creates a tangential thrust over the main wheel (2) by a value of F sin φ wherein F is the projected force arising out of the gas pressure. However there are six pockets are used in the drawing, so the resultant tangential force will be 6 F sin φ acting around a second rotary axis (7). As each engine module comprising two bars therefore there will be two chambers wherein one is a combustion chamber (70) and other is a non-combustion chamber (97). The combustion chamber is demarcated by the two bars (3, 5), the main wheel (2), the plurality of torque enhancer pocket (48) and the inner circular chamber (1) itself. On the other hand the non-combustion chamber (97) is also demarcated by the two bars (3, 5), the main wheel (2) and the inner circular chamber (1) as like FIG. 1 wherein the non-combustion chamber (97) is connected to a concentric void (27) of the main wheel by a plurality of sweeper (23). This concentric void (27) is a hollow cylindrical chamber passing throughout the main wheel (2) along the second rotary axis (7) wherein the coupling between bars and power shaft rotates along a circular path during engine operation with respect to main wheel. This concentric void (27) is submersed by the lubricating oil (80) as like in FIG. 1 and FIG. 6 and due to having a connection with the non-combustion chamber (97), the lubricating oil (80) thus being able to freely connect the entire non-combustion chamber (97). The main wheel equipped with the sweeper (23) which has a structural propensity to retain the lubricating oil (80) within the concentric void (27) as such to permit a few amount of lubricating oil (80) in the non-combustion chamber (97) and also to avoid an unwanted compression of lubricating oil in said non-combustion chamber during high speed engine operation.

The concentric rotation of the bars (3,5) and simultaneous eccentric rotation of the main wheel (2) continuously transform the demarcated combustion chamber (70) between a minimum volume or a bottom dead volume (104) and a maximum volume or a top dead volume (103) in every rotation of the power shaft (10) illustrated in FIG. 3. The demarcated combustion chamber (70) is transformed into the bottom dead volume two times and into the top dead volume two times in each complete power generation cycle by the general principle of an Otto cycle and a four stroke cycle wherein power is generated during the combustion cycle. The combustion cycle is the period during which air-fuel mixture is exposed to combustion done by a surface oriented spark plug (19) or fuel injector in case for another four stroke engine. The surface oriented spark plug having a curved sparking surface which is symmetric to the wall of inner circular chamber (1) such that it can facilitate a smooth sliding of bar/wiper seals (87,90) when passing beyond the spark plug during each rotation in order to sweep any lubricating oil from the spark surface. The sparking surface is generally a metallic type cap electronically connected to the spark electrode (19) and further surrounded/separated by the ceramic insulator (55) from the metallic casing (12). The spark electrode thus being connected to a combination of high voltage switch mode transformer and mosfet transistor to control the high frequency switching circuit for the sparking. This spark switching is done by a high frequency operable microcontroller to control the precise timing of the spark plug in accordance with power shaft RPM. This RPM is measured by led radiation/source (106) via convex lens (108) imposing on some angularly spaced reflectors (105) upon the radially inclined surface (108) of flywheel (114) periphery illustrated in FIG. 10A and this light radiation is reflected back to a light sensor (107) via another convex lens (108) thus detecting the power shaft (10) or prime mover (3) position in the inner circular chamber wherein the flywheel (114) is secured with the power shaft (10). This detection process can also be precise if the reflectors (105) are secured/arranged in a circular path covering 180 degrees region inclined surface (108) on the flywheel and a first reflector comes on the way of rotation will be counted as a zero degree position of the prime mover or flywheel as light rays focused on a point (109) on a reflector (105) while subsequently reflected back to the light sensor (107) to make a focus on the point (109) illustrated in FIG. 10D and wait for subsequent reflectors to appear in the way of flywheel rotation in terms of time. A reflector less region of flywheel will diverge the light rays away from the light sensor (107) as like FIG. 10C thus providing a blank signal. However when all reflectors finish counting within 180 degrees coverage for a complete rotation of the flywheel then the blank signal will appear in microcontroller due to unable to focus at light sensor for reflector less reflection in the remaining 180 degrees coverage of (113) which signalling the end of counting process for the first cycle of flywheel. This mechanism is named as an optically controlled mechanism as this mechanism comprises spark plug in case for an Otto cycle or comprises a fuel injector in lieu of spark plug in case for another four stroke engine or CI (compression ignition) engine. In this way a precise position of prime mover can be detected in terms of time and subsequently precise combustion timing thus can be achieved.

There are at least four outward opening valves (28, 29, 40, 41) to control intake and exhaust of gases wherein two valves (28, 29) are used for inlet and two valves (40, 41) are used for outlet of gases. As the bottom dead volume (104) and the top dead volume (103) illustrated in FIG. 3, reside in opposite direction to each other within the inner circular chamber (1) that's why at least two valves are used for inlet or outlet in order to smoothly connect/cope with the transition phase (101/102) between the bottom dead volume (104) and the top dead volume (103). Furthermore the outward opening valve is introduced for its characteristic, that moving away from the inner circular chamber to open a valve port (25/26/42/43) and doing vice versa to close the same. The assembly thus assembled by these valves (28,29,40,41) are named as outward opening valve assembly for inlet (15) or outlet (18). Each outward opening valve assembly further comprising two individual valve assemblies connected with each other by a common inlet (33) or outlet (44) header wherein each individual valve assembly comprising at least one outward opening valve (28/29/40/41), at least one cam (31) and at least one mechanical spring (30) coupled together and both the cams (31) of an outward opening valve assembly are secured in parallel/axially with a common camshaft (35/45) for respective valve assembly illustrated in FIG. 5C, FIG. 11A, FIG. 11B and FIG. 1. Each of the cams (31) is semi-circular profiled (nearly a half moon in shape) and all the coaxial cams are secured with a common camshaft by a radial lagging angle (FIG. 11A and FIG. 11B) to each other along the direction of rotation in order to facilitate a lagging in timing of valve opening/closing in inlet or outlet. In FIG. 3 the vertical valve (29) opens later than the inclined valve (28) in inlet valve assembly (15) due to lagging angle between two cams (31) secured with camshaft (35) and similarly the inclined valve (41) opens later than the vertical valve (40) in exhaust valve assembly (18) for the same reason. Additionally for safety purpose a valve seat (76) is provided at valve port of all the valves. As there are two valve assemblies, therefore there are two camshafts (35, 45) which are rotating around a third axis and a fourth axis respectively wherein the third axis (50), the first rotary axis (11) and the fourth axis (51) are sequentially parallel to each other when aligned within a first plane $\eta\acute{\eta}$ or (52) such that inlet (15) and outlet (18) valve assemblies can be arranged around the inner circular chamber in opposite direction about the first rotary axis. Furthermore for consistent operation of the valve assemblies with respect to the rotation of main wheel (2), the second plane $\alpha\acute{\alpha}$ (53) is required to be perpendicular to the first plane about the first rotary axis such that the third axis and the fourth axis have an identical distance from the second rotary axis. Though the camshafts (35, 45) are driven by the power shaft (10) by a pair of chains (17) at a speed ratio of 1:2 as like traditional reciprocating engine, but it is not limited to use the chains (17) only rather a combination of gears or belts or any suitable combination of a rocker arm and push rod can also be used to maintain the valve timing. In this regard the camshaft (35/45) secured with respective chain sprocket (92/93) while the power shaft (10) is secured with chain sprocket (91).

The next term is sealing in this engine system. Each bar comprising a leading/bar seal (87) and a trailing/wiper seal (90) wrapped around at free end of the bars (3,5) to prevent gas leakage in combustion chamber (70) tangentially as figured in FIG. 8C and also in FIG. 5a. The leading seal comprising two bar seals and the trailing seal comprising two wiper seals (90). All these seals are accompanied by a pleated formed spring (49) to facilitate a gripping with the wall of the inner circular chamber. In fact all kind of seals are accompanied by the pleated formed spring (49). These seals (87, 90) are not only providing a resistance to leakage of gas during compression or combustion but also clean the spark surface of the spark plug (19). The main wheel comprising at least two face seals (89) in order to prevent axial leakage. The face seal is a semi-circular metal seal accompanied by the pleated formed spring which only prevents leakage at a boundary of the demarcated combustion chamber. Moreover the profile of this face seal is configured in such a way that it has a propensity to grip with the inner circular chamber at (81) which is figured in FIG. 8A and in FIG. 8B. There are another four rectangular cross sectioned bar seals for each guider wheel wherein two bar seals (21) providing sealing to internal wall and other two bar seals (54) providing sealing at external mating wall of that guider wheel as like FIG. 8D and FIG. 5B. The seal (21) is grooved at (79) within the guider wheel (16/20).

This engine is almost vibration less if pair of engine module is connected in parallel as like FIG. 9, by a combined power shaft. In that case the prime mover installation of first engine module will be in counter side to that of the second engine module with respect to the combined power shaft whenever all the wheel and bars assemblies rotate at a common direction (8). Consequently the camshaft of inlet valve assembly of first engine module will be coaxially secured with the camshaft of outlet valve assembly of second engine module by a first combined camshaft (35). Similarly the camshaft of outlet valve assembly of first engine module will be coaxially secured with the camshaft of inlet valve assembly of second engine module by a second combined camshaft (45). Another system can be adopted to minimize the vibration is to imbalance the main wheel structurally while it is rotating around the second rotary axis and this vibration is neutralized by a counter vibration generated due to the rotation of said bars. For this purpose a metal in the main wheel is removed from the main wheel (2) along a curved path (47) in FIG. 1 or in FIG. 4A. In this way the rotary engine can be designed in a simplest possible manner in case for a vibration issue.

This rotary engine also comprising the heat treatment of inlet air to minimize the heat loss by recycling a portion of wasted heat. For this purpose water with coolant (59) is circulated in the engine through water circulation hole (13) within the casing (12) and heated water (59) exchange heat to first stage heat exchanger (56) by a first actuator valve (66) to partially or fully extract heat from heated water to preheat inlet air. However inlet air is limited to receive upto a certain amount of heat such that this preheated inlet air (82) cannot create auto ignition in compressed air-fuel mixture before the spark plug sparks. If inlet air (57) is not sufficiently preheated by the cooling water (59) alone then a second approach is maintained to exchange heat from the exhaust gas (62) by the help of a second actuator valve (83) to retain said required amount of heat in the inlet air (63) before entering into the engine. The preheated inlet air (63) and (63) is then mixed with atomized fuel injected by fuel injector (69) in a fuel mixing chamber (68). The required amount of heat exchanged is actuated by said actuator valves (66,83) as mentioned earlier wherein these actuator valves are basically a three way valve controlled by same micro controller unit that is also used for sparking circuit. Beside of this purpose, the micro controller unit is also used for injecting fuel in fuel mixing chamber (68) by measuring power shaft RPM.

For ease of installation, the main wheel (2) is divided by equal two halves as like FIG. 6 and FIG. 4A wherein the effective depth for accommodating the bars will be d/2 in each said half whenever both the halves are joined together by a plurality of bolts (73). Consequently the effective height of the bars (3, 5) will be d illustrated in FIG. 5A. However for ease of installing the wheel bars assembly in the casing (12), it can be divided into two equal halves as like FIG. 7A and FIG. 7B regarding each engine module in order to facilitate two different valve types (an inclined type and a vertical type placed in two halves of casing) and both the casing halves can be joined together through accumulating points a and á in a single point by a plurality of bolts (100) into the screw holes (14). In case for combining a plurality of engine module in parallel a number of through holes (46) are incorporated in a section (74) of plane b to facilitate a lubricant oil flow between the engine modules. It is required that a plain surface denoted as c is to be the same label of plane b wherein plane b is co-operating with concentric void (27) by a journal bearing (9) in the casing. However the power shaft (10) is mounted by journal bearing (98) in the casing (12) and the camshafts (35) and (45) are mounted by journal bearing (96) and (85) respectively in said casing (12).

In the conclusion from the above discussions, it can be surely stated that the proposed inventive engine comprises an important aspect like stability during engine rotation as the rotation of each of the bars with respect to the power shaft is found to be all the way symmetrical along the circular surface of the inner circular chamber which furthermore ensures a stability in sealing system thereby. However the engine can be also designed in another alternative manner just to modify by hinging both the prime mover and the follower with power shaft, further coupling the main wheel with the power shaft by a gear mesh to transmit the power to the power shaft wherein the camshaft is coupled with the power shaft at a gear ratio of 2x (x is the gear ratio between main wheel and power shaft, wherein x>1). Although the proposed engine can also be designed in aforesaid alternative form, but in terms of simplicity and efficiency the proposed inventive engine is well ahead over aforesaid alternative design. In order to run the proposed inventive engine in a more systematic manner, the electronic connections are needed to be configured in an organized way such that microprocessor unit can be able to control sparking circuits, sensor circuits and throttle valve actuating circuits simultaneously and efficiently. Nevertheless to mention that starting of engine as well as powering all the electronic devices and circuits are necessitated to be powered by a battery that performs as an energy storage along with a DC filtering device connected through rectifiers to rectify the electrical power from an alternator and this alternator is further linked to the engine power shaft by a belt drive wherein the capacity of the battery is to be calculated according to a maximum engine power output along with a power needed by those electronic circuits and devices.

The invention claimed is:
1. A rotary engine assembled by an engine module and said engine module comprising:
   an inner circular chamber denoting a cylindrical cavity defined by a wall;
   a power shaft pivotally coupled to, rotating around a first rotary axis while operating coaxially within, said inner circular chamber;
   a main wheel comprising an asymmetric structure, further rotating around a second rotary axis within said inner circular chamber wherein the second rotary axis is displaced from the first rotary axis; and
   only two bars rotating around said first rotary axis, traversing said main wheel radially whereby said main wheel, said power shaft and said only two bars, rotate at a same direction by being coupled together while transmitting a power to the power shaft.
2. The rotary engine in claim 1, wherein each of said only two bars having a wiping contact with the wall of the inner circular chamber.
3. The rotary engine in claim 2, wherein the wiping contact comprising a first row of two bar seals and a second row of two wiper seals.
4. The rotary engine in claim 1, wherein the main wheel further comprising at least two face seals.
5. The rotary engine in claim 1, wherein the asymmetric structure of the main wheel reduces a vibration in the engine.
6. A rotary engine assembled by an engine module and said engine module comprising:

an inner circular chamber denoting a cylindrical cavity defined by a wall and demarcating only one combustion chamber;

a power shaft pivotally coupled to, rotating around a first rotary axis while operating coaxially within, said inner circular chamber;

a main wheel comprising a concentric void traversing throughout the main wheel axially, demarcating said only one combustion chamber further rotating around a second rotary axis within said inner circular chamber wherein the second rotary axis is displaced from the first rotary axis;

a non-combustion chamber demarcated by said main wheel and said inner circular chamber;

a sweeper mounted in the main wheel, connecting said non-combustion chamber with said concentric void; and only two bars rotating around said first rotary axis while demarcating said only one combustion chamber, further demarcating said non-combustion chamber and traversing said main wheel radially such that said main wheel, said power shaft and said only two bars, rotate at a same direction by being coupled together while transmitting a power to the power shaft wherein said only one combustion chamber having a combustion event.

7. The rotary engine in claim 6, wherein said sweeper comprising a lubricating oil.

8. The rotary engine in claim 6, wherein the main wheel further comprising a torque enhancer pocket demarcating said only one combustion chamber.

9. The rotary engine in claim 6, further comprising at least two guider wheels having a respective guider wheel coupled to a respective bar of the only two bars within the main wheel as such to allow a hinging and a sliding in a same plane only.

10. A rotary engine assembled by an engine module while said engine module comprising:

an inner circular chamber signifies a cylindrical chamber defined by a wall and demarcating only one combustion chamber;

a power shaft pivotally coupled to, rotating around a first rotary axis while operating coaxially within, said inner circular chamber;

a main wheel demarcating said only one combustion chamber, rotating around a second rotary axis within said inner circular chamber wherein the second rotary axis is displaced from the first rotary axis;

only two bars rotating around said first rotary axis while demarcating said only one combustion chamber by being coupled between the main wheel and the power shaft as such to transmit a power to the power shaft wherein said only one combustion chamber having a combustion event; and an outward opening valve assembly comprising:
at least two valves wherein there is a first valve and a second valve;
a rotating camshaft; and
at least two rotating hemicycle profiled cams wherein each hemicycle profiled cam of said at least two hemicycle profiled cams is coupled to a respective abutment of the first valve and the second valve and the at least two hemicycle profiled cams effectuate said first valve and said second valve to move away from the cylindrical chamber to open a first valve port and a second valve port respectively wherein said at least two hemicycle profiled cams are coaxially secured with said rotating camshaft in such a way that a valve timing of said second valve is lagging from a valve timing of said first valve.

11. The rotary engine in claim 10, wherein the only one combustion chamber is rotatably transformed between a bottom dead volume and a top dead volume.

12. The rotary engine in claim 11, wherein the only one combustion chamber is further transformed through at least two transition phases wherein each of said at least two transition phases is a phase between the bottom dead volume and the top dead volume within the cylindrical chamber wherein the outward opening valve assembly communicating with at least one of said at least two transition phases.

13. The rotary engine in claim 12 is a four stroke engine.

14. The rotary engine in claim 13, wherein an optically controlled mechanism, controls an ignition timing for executing said combustion event of an air-fuel mixture.

15. The rotary engine in claim 14, wherein the optically controlled mechanism further executes said combustion event by one of a fuel injector and a surface oriented spark plug wherein the optically controlled mechanism, comprising a reflector connected to the power shaft, further projecting a light from a light source to a light sensor via said reflector in order to achieve a signal, further converting said signal to a data in a microcontroller and further processing said data in said microcontroller to determine said ignition timing.

16. The rotary engine in claim 15, wherein the surface oriented spark plug comprising a spark surface evenly leveled with the wall of the inner circular chamber.

* * * * *